United States Patent
Harrington

(10) Patent No.: US 7,440,926 B2
(45) Date of Patent: Oct. 21, 2008

(54) RIGHTS ESTABLISHING SYSTEM AND METHOD

(75) Inventor: Robert J. Harrington, Framingham, MA (US)

(73) Assignee: OptNow Real Estate Corporation, Framingham, MA (US)

(*) Notice: Subject to any disclaimer, the term of this patent is extended or adjusted under 35 U.S.C. 154(b) by 19 days.

(21) Appl. No.: 11/052,146

(22) Filed: Feb. 7, 2005

(65) Prior Publication Data

US 2005/0177524 A1 Aug. 11, 2005

Related U.S. Application Data

(60) Provisional application No. 60/542,513, filed on Feb. 6, 2004.

(51) Int. Cl.
*G06F 17/00* (2006.01)
(52) U.S. Cl. .................................. 705/80; 705/1
(58) Field of Classification Search .............. 705/80, 705/1
See application file for complete search history.

(56) References Cited

U.S. PATENT DOCUMENTS

| 6,615,187 | B1 | 9/2003 | Ashenmil et al. | 705/35 |
| 2001/0032128 | A1* | 10/2001 | Kepecs | 705/14 |
| 2004/0111347 | A1* | 6/2004 | Kauffman et al. | 705/36 |
| 2004/0220820 | A1 | 11/2004 | Brush et al. | 705/1 |
| 2004/0220823 | A1* | 11/2004 | Brush et al. | 705/1 |
| 2004/0260578 | A1* | 12/2004 | Jin | 705/4 |

FOREIGN PATENT DOCUMENTS

JP  2003058655 A * 2/2003
WO  WO/2004/099927  11/2004

OTHER PUBLICATIONS

Student Edition Restatement of the Law Second Contracts 2d, May 17, 1979, 5 pages.*

* cited by examiner

*Primary Examiner*—Pierre E Elisca
(74) *Attorney, Agent, or Firm*—John M. Garvey; Foley & Lardner LLP

(57) ABSTRACT

A system and method for providing a present consideration to a consumer and coincidentally establishing a future right for a holder to offer or to provide, at the holder's option, a defined set of goods or services in response to a trigger event.

66 Claims, 6 Drawing Sheets

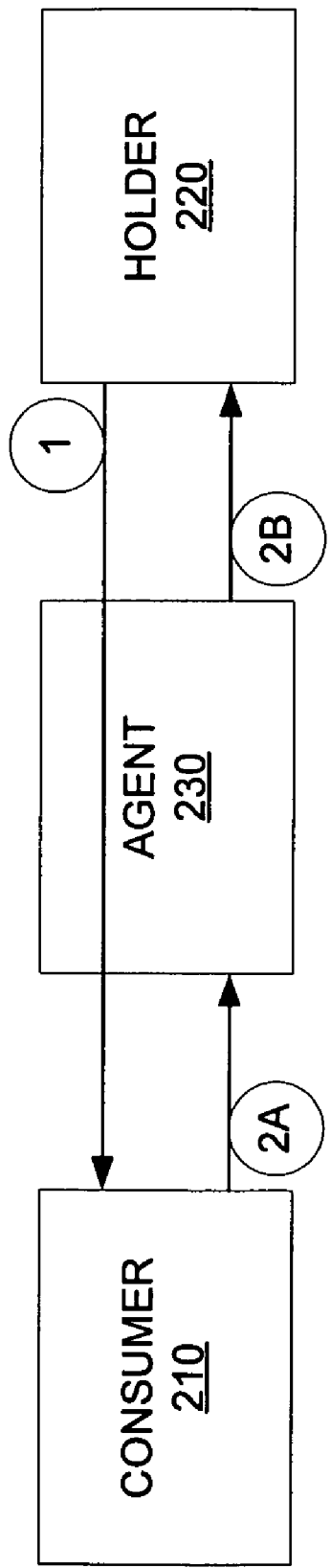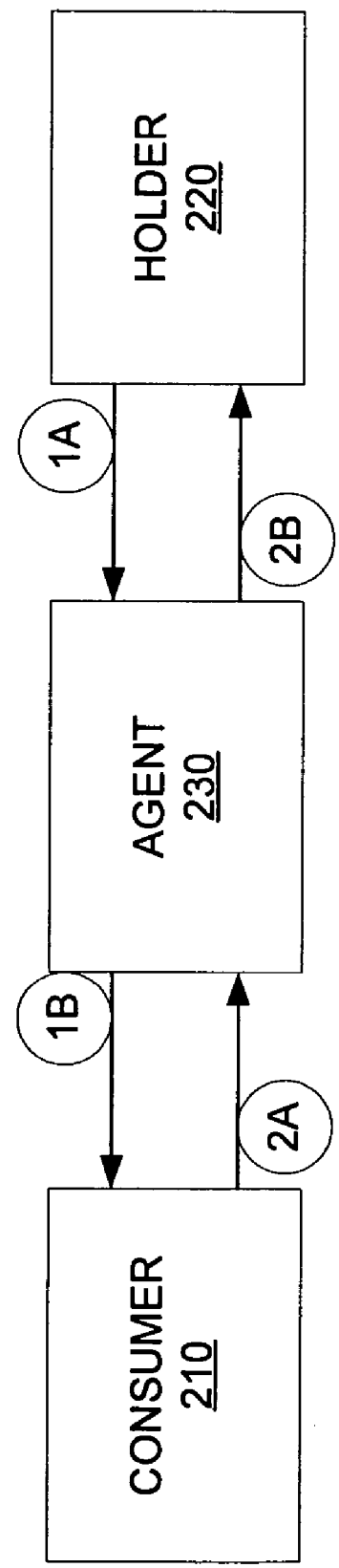

RIGHTS ESTABLISHING SYSTEM AND METHOD

CROSS REFERENCE TO RELATED APPLICATIONS

This application claims the benefit of priority under 35 U.S.C. §119(e) from, commonly owned U.S. provisional patent application Ser. No. 60/542,513, entitled RIGHTS ESTABLISHING SYSTEM AND METHOD, filed Feb. 6, 2004 and this application claims the benefit of priority under 35 U.S.C. §120 from co-pending, commonly owned U.S. non-provisional patent application Ser. No. 10/162,288, entitled METHOD AND SYSTEM FOR ESTABLISHING RIGHTS ASSOCIATED WITH PROPERTY TRANSACTIONS, filed Jun. 4, 2002, both applications are hereby incorporated by reference.

FIELD OF THE INVENTION

The inventive concepts generally relate to the field of future interests, and more specifically to associating options and rights with future transactions.

BACKGROUND

Historically, providers of products and services have provided those products or services in response to receipt of consideration from a consumer or client of those products or services. This relationship between the consumer and the provider took, whether explicit or implicit, the form of a contract where the provider received consideration in the form of a payment and the consumer received the products or services. In some instances performance by either party might not occur exactly at the time of contract formation. As one example, a consumer could enter into a brokerage (or listing) agreement having a promise to pay a real estate broker for its brokerage services at the closing of the sale of the subject real estate. In such a case, the contract is formed, but payment to the broker is delayed until after the broker completes performance of his or her services. In other cases, the provider performs and the consumer pays over time. For example, in a lending transaction a mortgage broker provides a loan upfront and the borrower (i.e., consumer) pays it back with interest over time. In this case completion of payment to lender may take 30 years—so completion of the consumer's obligations is accomplished long after contract formation or the related real estate transaction. These types of transactions are well known—and many examples exist.

There are other types of transactions where a consumer can purchase an option or a right of first refusal for goods or services. For example, a consumer can purchase a right of first refusal for the option to buy a product if and when it becomes available. Thus, the consumer can purchase a right to obtain a product in the future. As another example, in sports many professional athletes' contracts have options for additional years that are typically exercisable at the teams' options. In this case the team is the consumer of services and the athlete is the service provider.

In contrast, to date, situations where a provider of goods or services procures a right or option to be the future provider of goods or services is not generally done or to be a future bidder for such goods or services. There are situations where providers offer coupons that are redeemable in the future for goods or services offered by that provider, but in those cases the provider does not obtain a right to provide the future services or to bid on the opportunity to do so. The coupons are an attempt to entice the consumer to choose the provider, with no obligation on the part of the consumer to do so.

SUMMARY OF THE INVENTION

A method of obtaining a future right comprising one or more steps carried out by a computer. The method comprises the steps of identifying a consumer and a holder; generating an opt-contract establishing an upfront consideration to the consumer and coincidentally establishing a future right option in the holder, wherein the future right is a right to offer or to provide to the consumer a defined set of goods or services in response to a trigger event. In response to the trigger event, said holder, at its option, offering or providing the set of goods or services.

A method of attracting and retaining agency representatives for an agency provider comprising one or more steps carried out by a computer, said method comprising the steps of defining a set of consumers having a relationship to an agency representative; providing a present consideration to the set of consumers and coincidentally establishing a future right for the agency provider to offer or provide, at the agency provider's option, a defined set of goods or services in response to a trigger event; monitoring for an occurrence of said trigger event; and in response to the trigger event, said provider providing, offering to provide or opting not to provide or not to offer to provide the set of goods or services.

An opt-contract system comprising a computer program code executable by at least one processor. The computer program code includes logic comprising the steps of identifying a consumer and a holder, generating an opt-contract establishing an upfront consideration to the consumer and coincidentally establishing a future right option in the holder, wherein the future right is a right to offer or provide to the consumer a defined set of goods or services in response to a trigger event, and in response to the trigger event, said holder, at its option, offering or providing the set of goods or services.

An opt-contract system comprising a database including data identifying a consumer and a holder, an opt-contract module configured for generating an opt-contract establishing an upfront consideration to the consumer and coincidentally establishing a future right option in the holder, wherein the future right is a right to offer or provide to the consumer a defined set of goods or services in response to a trigger event; and a trigger module configured for prompting the holder, at its option and in response to the trigger event, offering or providing the set of goods or services.

An opt-contract registry system comprising at least one registry computer system comprising an interface for facilitating communication with one or more external computer systems via a network, at least one database coupled to the registry computer system and comprising a set of opt-contract data identifying, for each of a plurality of opt-contracts, at least one consumer, at least one upfront consideration to the at least one consumer, at least one holder, and a set of future right options for the at least one holder related to the at least one consumer, wherein each future right is a right for the at least one holder to offer or to provide to the at least one consumer, at the at least one holder's option, a defined set of goods or services in response to at least one trigger event, and a trigger module configured for monitoring a set of external systems and generating a future right prompt in response to detection of the at least one trigger event.

BRIEF DESCRIPTION OF THE DRAWINGS

The drawing figures depict preferred embodiments by way of example, not by way of limitations. In the figures, like reference numerals refer to the same or similar elements.

FIGS. 2A-2E are representative relationships in accordance with the present invention.

DETAILED DESCRIPTION OF THE PREFERRED EMBODIMENTS

At a general level, provided is a system and method for securing or obtaining a right to participate in a future transaction, in exchange for a present consideration given—which takes the form of an "opt-contract". The right to participate in a future transaction is referred to as a "future interest" or "future right" in the future transaction, i.e., in a transaction that is to occur sometime after the present consideration is given. Thus, there is a time period that exists between the giving of the present consideration and the future transaction. That time period may be fixed or open ended. When the time period is open ended it may be that it only becomes finally determined upon the occurrence of a predetermined event, e.g., when the party receiving the present consideration applies for credit, seeks to buy, sell, lease or rent real estate, and so on. As a general precept, the holder is typically a provider of goods or services and the party that receives the preset consideration is a "consumer", or potential future consumer, of those products or services. The consumer could also be referred to as a "client", or potential future client, of those products or services. The future right could run with a consumer or with property.

In certain embodiments, given that the consumer and holder have established a "business relationship", the holder could receive a right to permit communication between parties, where other entities may be prevented from such communication—e.g., the consumer opting out of a "do not call list" with respect to the holder. As an example, if the consumer were looking for a new long distance carrier. The consumer could get $50 and allow itself to be added to a list of consumers that long distance carriers could call for a defined period of time—i.e., an "opt-on" to a list scenario. This of course could alternatively be implemented as an indefinite "opt-off", or for a period of time after which the names of the consumers could, for example, be sold.

But opting could also be implemented with other types of listings or programs, i.e., where consumers could opt-on or opt-off such lists. An example would be in the context of MLS listings. In one implementation, real estate firms could show the MLS listings on their own website, but they could also chose to opt-off the list of firms permitted to show the MLS listing. In such a case, the firm that opted-off could not show the MLS listing of other firms, but that opted-off firm could also be excluded the MLS listings shown by such other firms. Accordingly, people could be paid to change their preference with regard to inclusion on such a type of list.

Figure 1:
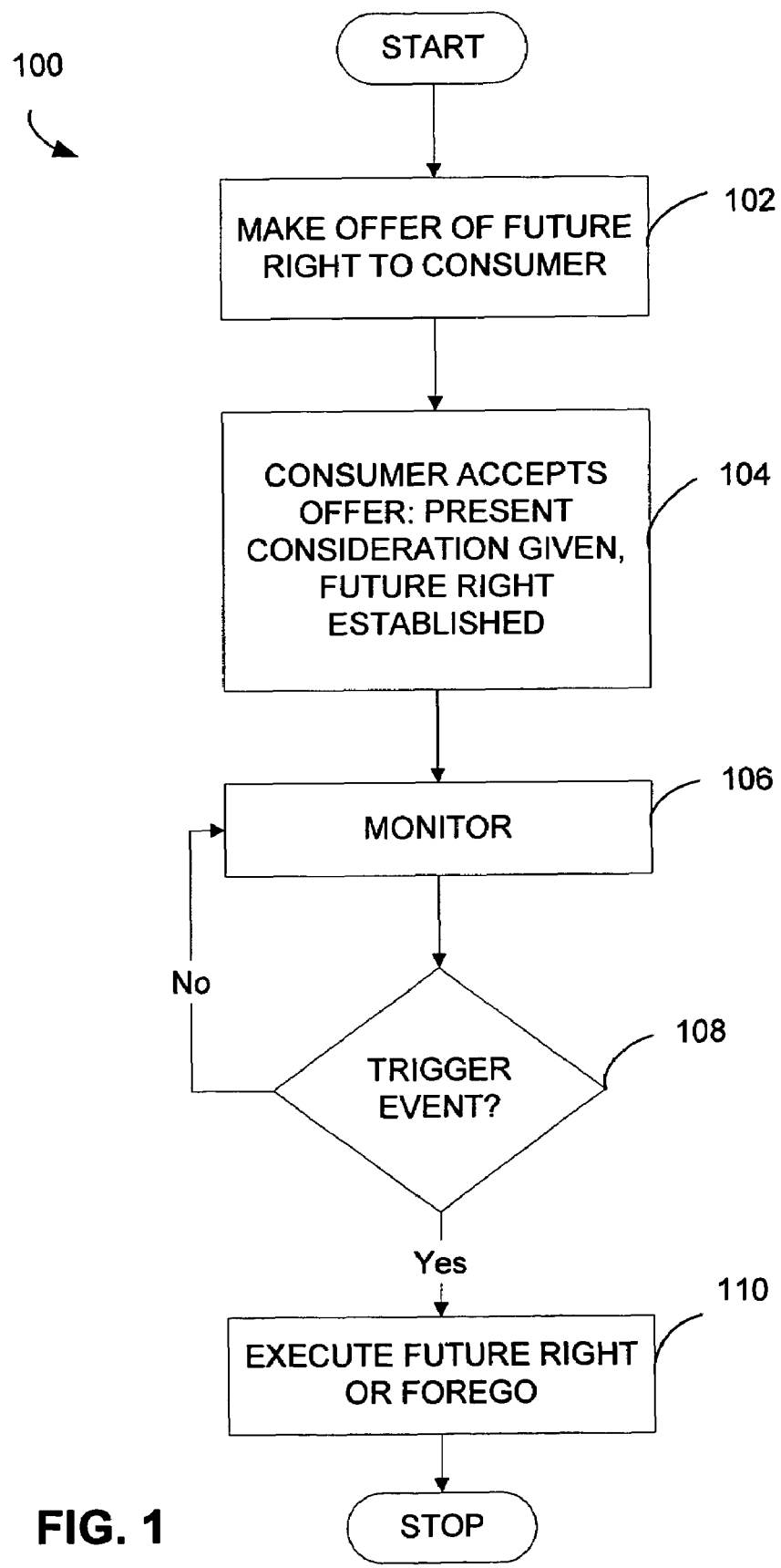
FIG. 1 is a flowchart showing a method in accordance with the present invention.

FIG. 1 is a flowchart 100 depicting a method in accordance with the present invention for a provider (or holder) to obtain a future right in return for a present consideration given to a consumer. In step 102, an offer is made by a provider to a consumer. The offer includes, identification of the present consideration to be given to the consumer and the future right to be given to the provider. The offer also includes identification of a condition to be satisfied, or "trigger" of the future right. In step 104, the consumer accepts the offer and the opt-contract is formed. While it is not shown, negotiation between the consumer and provider may take place prior to acceptance of the offer. Upon acceptance, the consumer receives the present consideration and the provider becomes the holder of the future right. Thus the future right is then owned or vested in the holder, and may be transferable.

In step 106, the holder monitors for the presence of the trigger event. The trigger event could be, for example, an event such as an act by the consumer related to or in furtherance of buying or selling the goods or services for which the holder has a right, or at least related thereto. For example, the consumer's application for a mortgage could trigger the holder's right to be a listing broker of the consumer's present real estate or a buyer's broker for the real estate being purchased by the consumer. It could, perhaps, trigger the right of a holder to provide a home inspection, title work or other related legal service or other related real estate transaction services. The trigger event could be expiration of a time period, e.g., if the provider paints houses, after five years the provider could have a right to bid on repainting the consumer's house, with a right to match a more competitive competing offer. Other types of triggers could be defined—depending on the products and services and the creativity and needs of the consumer and provider. In many instances it is foreseeable that the future right allows the consumer to choose a different provider, so long as the holder has been given the opportunity to meet the terms offered by the different provider. Preferably, it would be incumbent on the consumer to use the holder if it did meet, or substantially meet, the terms offered by the different provider. This removes the risk of price gauging by the holder for performance in accordance with the future right.

In any of the various embodiments herein, the opt-contract could provide rights to the holder multiple times. Thus, if the consumer refuses the 1st time, the holder has subsequent opportunities to provide the goods or services. An opt-contract for the holder to provide snowplowing is one representative example. In such a case, the holder has 1st right of refusal for a snowplowing contract. If someone else bids very low, the holder can choose not to take the job at that low bid. Next year, or next snowstorm, the holder has the same option. Therefore, refusal in one instance need not terminate any future rights. The opt-contract could state a particular number of times the holder will be given the options, or it could be set based on a period of time.

In step 108, unless and until the triggering event is detected, the monitoring of step 106 continues. If, in step 108, the triggering event has been detected the method continues to step 110. In step 110, the holder has the opportunity to exercise his future right. Note that preferably the holder has no obligation to provide anything at this point in time, but rather has the option to do so at its discretion in the future. As a result, in step 110 the holder may choose (or "opt") not to exercise its right. If the holder does choose to exercise its right then there are a variety of scenarios that can take place, depending on the definition of the future right in step 104. Exercise of the holder's option may mean that the holder has the absolute right to provide the goods or services. In most cases, however, it is envisioned that the holder will have a right to bid on the opportunity to provide the goods or services. In such a case, as mentioned above, the consumer may be obligated to select the holder over competing bidders if the holder's terms are more favorable or at least as favorable as all other qualified bidders. In some cases, the consumer may be obligated to select the holder, so long as the holder's price is not greater than some threshold value above the price of other qualified bidders. For example, as long as the holder's cost or schedule is not more than 10% of the lowest qualified bidder, then the consumer is obligated to select the holder. In any of the above scenarios, there could be a buyout option where the consumer (or its preferred provider) can buyout the holder of its option for a fee, thereby eliminating any obligation of the consumer to select the holder.

As discussed previously a broker (as the holder) and consumer can take any of a variety of forms. The consumer can be an individual, person, trust, corporation, partnership, charitable organization, club, municipality, school, school district, government or government board, agency or entity, or any other entity—there are no inherent limitations on the type of entity. The consumer could also be a provider of goods or services in other contexts. The consumer may take the role of at least one of an owner, a prospective owner, a seller, or a prospective seller, licensee or licensor of real estate, vehicles, art, stock or other securities, intellectual property, jewelry, furniture, clothing, natural resources, equipment, or food—as just a few examples. The consumer could also be a present or future consumer of services, such as lending (e.g., mortgage, auto loan, student loan, etc.), real estate brokerage, improvement, maintenance, or construction, travel agency, financial planning, investment advising, medical treatment or counselling, education, legal, advertising, marketing, consulting, entertainment, therapeutic, spa, or grooming services. The holder may be a provider or a broker of any of the foregoing.

FIG. 2A through FIG. 2E show various types of possible relationships between a consumer and a holder, as illustrative examples. Other types of relationships may also be established, as will be appreciated by those skilled in the art—so long as present consideration is given to the consumer and a future right goes to the holder. In any of the various embodiments, the holder could change multiple times, over the life of the opt-contract. For example, the holder could sell or assign its interest to another party, which in turn could sell or assign its interest to yet another party. Or the holder could be comprised of more than one party. In such cases the multiple parties could provide companion or related services, or disparate services. Also, as with holders, there could be multiple agents.

An opt-contract could include more than one good or service as its subject matter, e.g., real estate brokerage for buying and selling, renting, leasing, mortgage, refinance, moving, home inspection, or other home related services and the trigger might be defined differently for different goods or service, or subsets thereof. Accordingly, each good or service, or subset thereof could be different as to first right, actual performance, and whether or not the first right or performance could be triggered multiple times. Goods or services could be defined specifically (e.g., plumbing services) or generally like all home maintenance services or home maintenance items, and so on. Such a structure could be referred to as "bundling", where opt-contracts could be combined in any combination. In various embodiments, there could be multiple holders and/or agents for each type of good or service and/or across several of the types of goods or services.

Additionally, in various embodiments, the consumer could be multiple consumers each having received upfront consideration and each giving a future right. For example, a condo complex could be opted and all (or at least several) of the individual condo owners covered, wherein the future right could be an obligation that runs with the property or owner, or both. For example, the holder could agree to pay each owner $100 in exchange for the holder getting a future right with respect to each owner. In other cases the holder could agree to provide a service to the condo association as up-front consideration, and get a future right with respect to each owner. For instance, the holder could have all of the parking lots resurfaced, or the roofs re-shingled, or the common areas painted as upfront consideration for the future right, for example, to provide mortgage, real estate brokerage, financial planning services, tax preparation services to each condo owner.

Figure 2A:
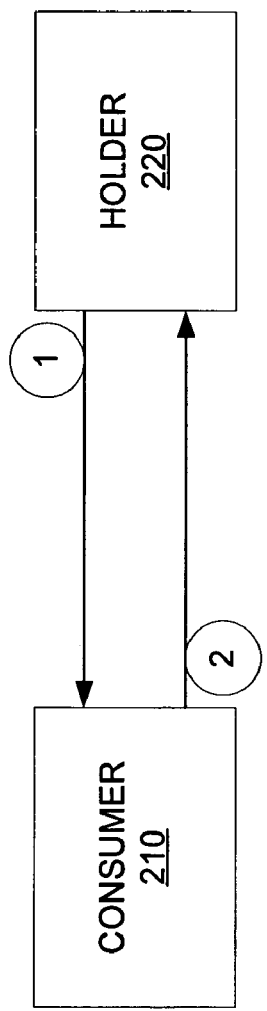

FIG. 2A represents the simplest relationship between a consumer 210 and a holder 220. In this figure, arrow "1" represents the present consideration going to the consumer 210 and arrow "2" represents the future right going to the holder 220. In FIG. 2A there are no intermediate parties.

Figure 2B:
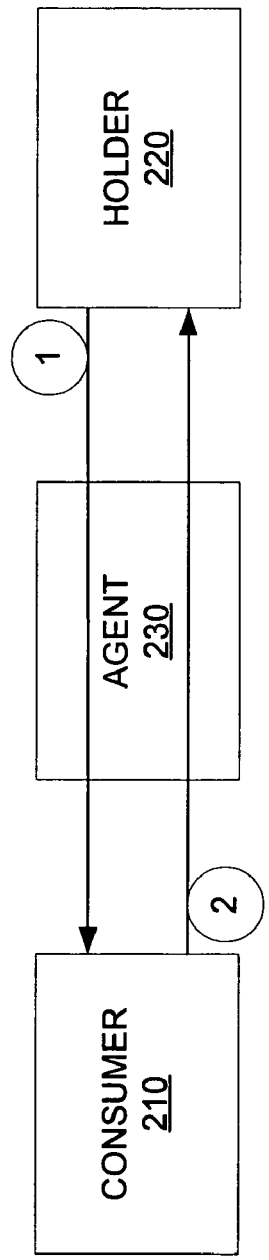

In FIG. 2B an "agent" 230 is introduced as an intermediate party. An agent may be or act as, for example, a broker or agent of the consumer 210 or a broker or agent of the holder 220. At a minimum, the agent is a party through which at least one of the present consideration 1 or future right 2 passes or is coordinated. In FIG. 2B the present consideration 1 passes from the holder 220 to the consumer 210 via the agent 230. And the future right 2 passes from the consumer 210 to the holder 220 through the agent 230.

Figure 2C:
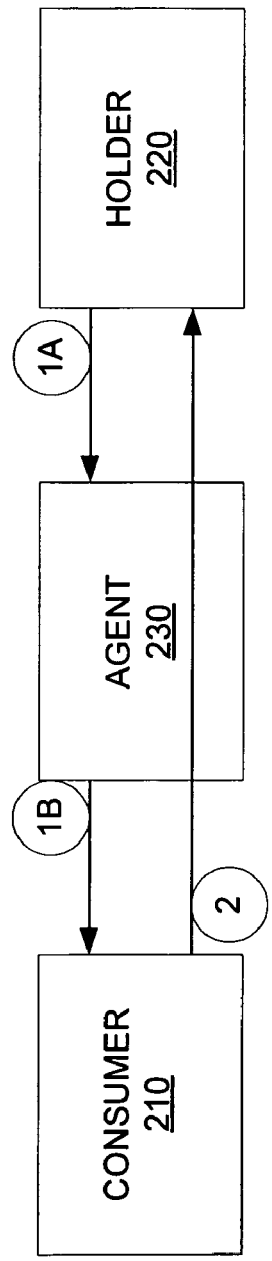

In FIG. 2C a present consideration 1A flows from the holder 220 to the agent 230. The agent 230 may modify or substitute the present consideration 1A and provide present consideration 1B to the consumer. Here future right 2 passes from the consumer 210 to the holder 220 via the agent 230, unaltered. FIG. 2D shows a situation similar to that of FIG. 2C. Here the present consideration 1 passes from the holder 220 to the consumer 210 via the agent 230, as in FIG. 2A. But the future right 2A passes from the consumer 210 to the agent 230, where the agent may modify or substitute the future right 2A and provide future right 2B to the holder 220. FIG. 2E represents the case where the agent modifies or substitutes both of the present consideration and the future right.

Figure 3A:
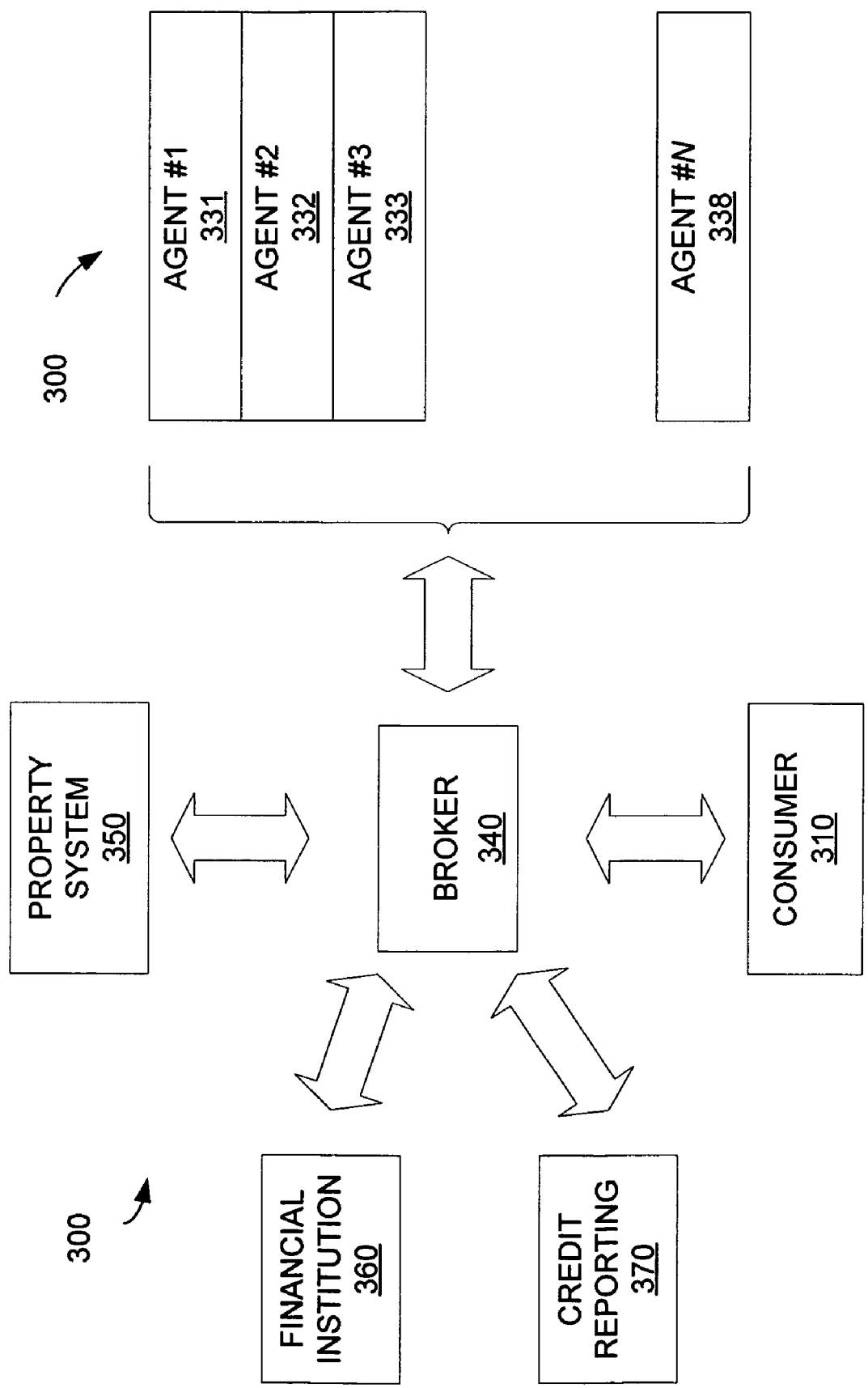
FIGS. 3A, 3B and 4 are representative architectures for implementing the method of FIG. 1 and the relationships of FIGS. 2A-2E.
Figure 3B:
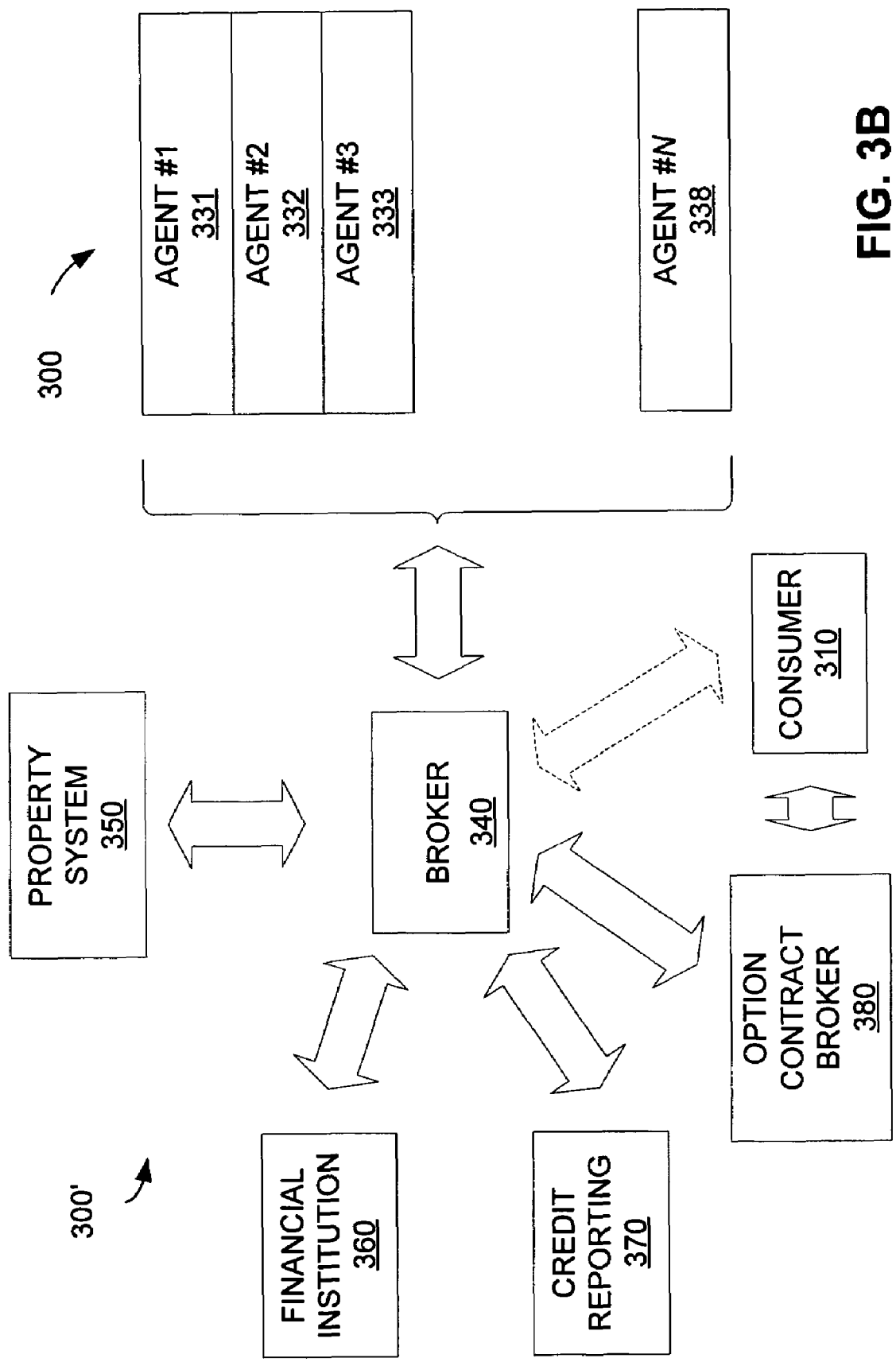

FIG. 3A and FIG. 3B represent embodiments in a real estate context that can take the general form of the relationships of FIG. 2A-FIG. 2E. FIG. 3A represents one possible embodiment 300 of the present invention, which allows a homeowner (i.e., consumer 310) to receive an upfront payment in return for the homeowner (i.e., consumer) agreeing to use the services of a real estate broker (i.e., holder) or brokerage firm 340, or giving that broker a first right of refusal to list the property. Associated with the broker 340 may be a group of agents 331-338, from which the ultimate listing agent may be chosen to sell the homeowner's house, e.g., agent #1 331. For example, assume that a homeowner 310 is offered the opportunity to enter into an "option listing contract" or "opt-contract" concerning any future offering of the homeowner's house for sale, i.e., a contract for the future right for the broker 340 to list the house. If, for example, the present value of the homeowner's house is $166,000, the broker could, for example, offer the homeowner 0.10% of the house's present value as present consideration for signing the opt-contract, and thereby providing the broker 340 the future right or option to be the listing broker for the property. In this example, the 0.10% is $166 in present consideration.

As mentioned above, in some forms, the future right could be a right of first refusal provided to the broker. The broker's future right could be guaranteed or optional, as described above. The right of first refusal could be related to, and exercised in response to, the homeowner's notice to the broker of an intent to sell, buy, refinance, or take a loan against a property, depending on the type of broker and holder right. With the right of first refusal, the broker has the option of whether or not to provide services or to match an offer by a competing broker. For instance, if a homeowner (e.g., a seller) can get better terms from a competing broker, the broker holding the right of first refusal may have the option of matching the more favorable terms of the competing broker and providing the broker services. However, if the broker chooses not to match, then the broker may be required to forfeit claims to any future compensation related to the opt-contract.

In the example above, assume that six years after the opt-contract, the homeowner 310 decides to list the house for sale. The homeowner 310 would then contact the original broker 340 (or the current owner of the opt-contract) and explain that it wants to list the house. Otherwise, the broker 340 could learn of the homeowner's intent to sell by some other means, e.g., reporting from a financial institution 360 or from a listing in a multi-listing service (MLS) system 350—if the homeowner 310 had failed to notify the broker 340 and listed the property through a different broker. Or the broker could learn from a credit reporting agency 370 of an inquiry related to obtaining the home owner a mortgage, such examples are discussed with respect to FIG. 4.

In one example, shown in diagram 300' of FIG. 3B, assume there is a opt-contract broker 380 that holds the opt-contract (i.e., future right) and that the opt-contract broker then uses a real estate brokerage firm 340 (and listing agent 331) to actually perform the services when the homeowner is ready to sell. Thus the homeowner 310 and broker 340 have a relationship as a result of the opt-contract broker 380 (indicated by the dashed line arrow). Assuming that e.g., the total sales commission is 5.00% (i.e., 2.50% listing and 2.50% selling), 25% of the total sales commission goes to the opt-contract broker, of which 15% goes to the actual opt-contract broker and the remaining 10% goes to covers the money that was provided to the homeowner six years ago, and various overhead costs. For example, assume that the home was listed by the broker 340 and sold for $294,699. The buyer's broker gets 2.5% (i.e., $7,367) and the seller broker side gets the same 2.5% (i.e., $7,367). The seller broker's $7,367 fee could be divided up as follows, as discussed above:

1) Opt-contract Broker: 25% of 2.5%=>$1,842
   a) Referral Fee (15 of the 25%)=$1,105
   b) Miscellaneous (10 of the 25%)=$737
2) Broker Split =$7,367−$1,842=$5,525
   a) Brokerage Office (30%) =$1,657
   b) Broker (70%) =$3,868

The Broker Split is the split between the broker 340 and the listing agent, e.g., agent #1 331.

In yet another embodiment, the homeowner gets, for example, 10 basis points (BPs) of the assessed value of the property and the broker 340 (or listing agent 331) gets 15% of the gross commission income (GCI) at sale. In some embodiments, the broker/agent get some money upfront for getting or referring an opt-contract. In yet another form, the homeowner gets, for example, 10 BPs (the same as above), and the agent gets 5 BPs upfront, and then only 10% of GCI out the back end, i.e., sale of the property. In other embodiments the BPs and percentages could be different, so maybe 10 BPs upfront to both the homeowner and to the agent, but nothing out the back end.

As will be appreciated from FIG. 2A-2E above, in various embodiments, the agent could advance the upfront consideration for the holder. In such cases, the holder could pay the agent at some future point in time, e.g., when future right is exercised. If the holder advances some or all of the upfront consideration, the holder could be entitled to collect interest or could be given some other type of consideration by the holder, e.g., some type of marketing, advertising or publicity. Various financial or other consideration schemes could be worked out between agents and holders, so long as the consumer gets upfront consideration and the holder gets a future right.

Figure 4:
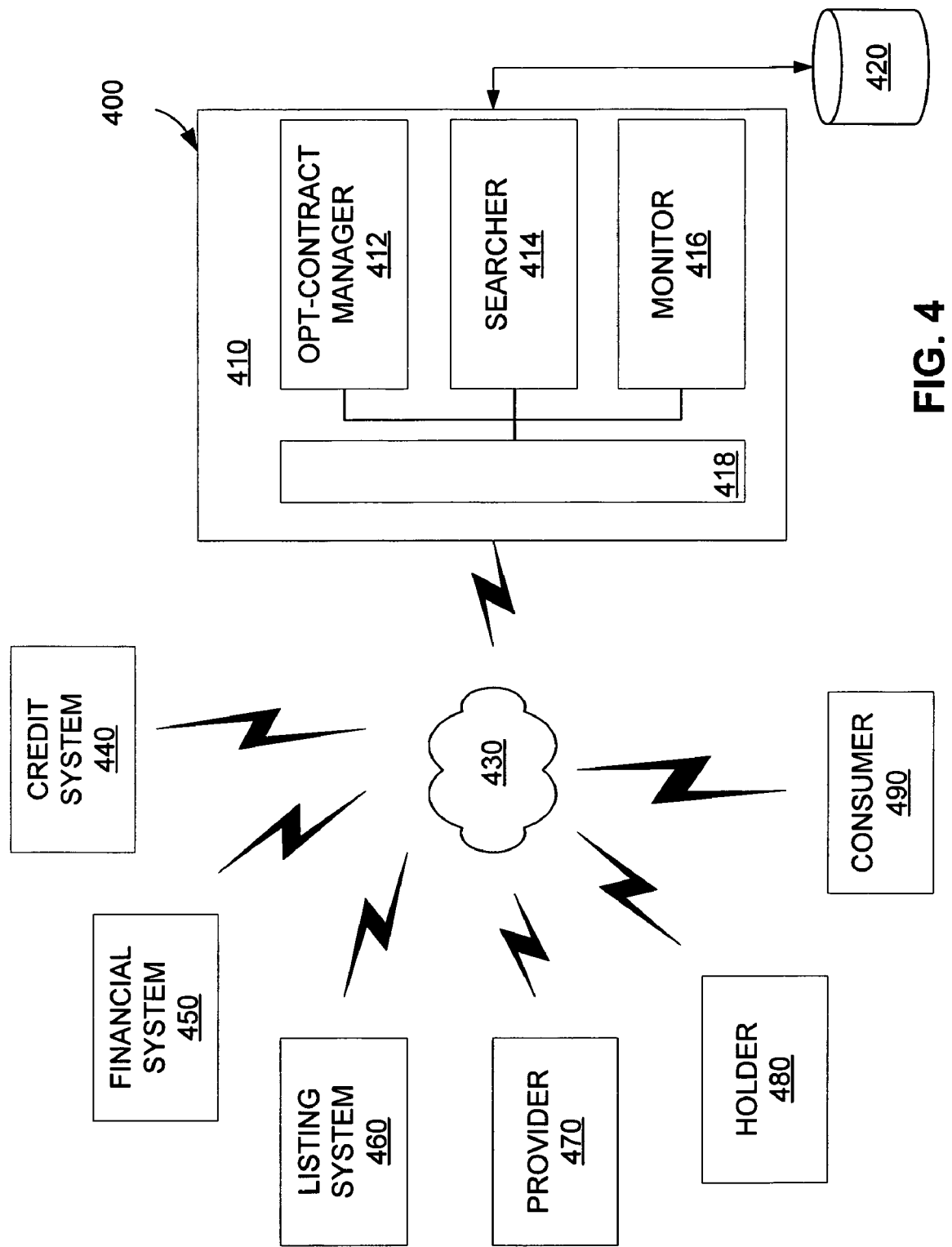

FIG. 4 provides an embodiment of an architecture 400 that includes a registry that may be provided for listing or recording opt-contracts. In FIG. 4 a registry system 410 includes or provides access to one or more databases or database systems 420 within which opt-contracts are recorded using an opt-contract manager 412. Opt-contract manager 412 provides general administrative tasks related to the recording and maintenance of opt-contracts in database 420. The opt-contract system 410 may include a searcher module 414 that allows external parties to search database 420 via a network 430 (e.g., the Worldwide Web/Internet). Such parties may include the holder 480 or consumer 490 that entered into an opt-contract. These parties may also record their opt-contracts with opt-contract system 410 over network 430. These external systems (e.g., 440, 450, 460, 470, 480, 490) may be configured with logic or program code that facilitates the foregoing access, and which may be configured for automated checking, querying, receiving or other communications of registry system 410 or other relevant systems.

A monitor module 416 may also be included and be configured to monitor for external events that trigger the holder's future right. Such events may be reported to monitor 416 of the opt-contract system 410 or determinable by the monitor 416 via access to external systems, such as a credit reporting system 440 that provides credit reports, a financial system 450 that lists applications for loans or credit, or a listing system 460 that lists property for sale or lease. In other instances, other providers 470 may also access the opt-contract system 410 to determine whether a future right with a holder 480 exists, before providing goods or services to consumer 490 that are the subject of an opt-contract with holder 480. Providers 470 may or may not be obligated to perform such a check.

In some embodiments the opt-contract system 410 may be configured to send notices to one or more of credit systems 440, financial systems 450, listing systems 460, providers 470, holders 480 or clients 490 of the recording, existence or removal of an opt-contract from database 430. In such a case, this could be done as part of a subscription by any of the foregoing to a service offered via the opt-contract system 410. In any of the foregoing embodiments the opt-contract system 410 may include an access control module 418, which selectively controls access to the opt-contract manager 412, searcher 414, monitor 416, and/or database 430. Depending on the embodiment, the access control module 418 could also include account management, rights management, firewall or other security functionality. In some embodiment, the opt-contract system 410 may charge a fee to perform searches or to record opt-contracts. In any of the foregoing embodiments, opt-contracts could be tracked by consumer (e.g., real estate property owner) or holder (e.g., real estate broker or agent). In any of the above cases, any of the external parties 440, 450, 460, 470, 480, or 490 may pull data from the database 430 to, for example, include opt-contract data in their own reports. For example, a credit reporting agency may pull opt-contract information from database 430 and include it within a consumer's credit report or in a standalone report. In another context, an external registry of deeds may access database 430 and record opt-contracts against related properties—or at least create a link or a reference between a property deed and a related opt-contract in database 430.

A secondary market may be created in which groups of opt-contracts are solicited by a first party (e.g., an independent contractor or realtor) and then sold to a second party (e.g., a real estate company). When selling these opt-contracts, the present value of these contracts (that statistically will mature over the course of years) is calculated, thus allowing the party who obtained the contracts (i.e., the first party) to get an immediate return on their contribution. This is similar to the manner in which a mortgage broker sells off mortgages to third parties based on the current value of the mortgage contract. However, for opt-contracts, a different type of cash flow is realized by the buyer of the contract, in that unlike mortgages in which each house generates a revenue stream every month, each opt-contract generates a single source of revenue when the homeowner in question sells their property. Where a secondary market is created, opt-contracts could be grouped and sold in bundles, or may serve as the underlying assets against which securities are offered—as an investment vehicle.

Current mortgage companies (i.e., companies who own the existing mortgages on a home owned by a homeowner) may enter into an opt-contract with the homeowner that (in exchange for consideration being provided to the homeowner) provides the current mortgage company with the opportunity to match the terms of any future refinancing of the homeowner's mortgage. As the current mortgage company owns the current mortgage, there is an automatic trigger in this system since the homeowner that wants to refinance must call in to get a payoff amount for the mortgage. At this point, the mortgage company can determine if the homeowner entered into an opt-contract. Further, these opt-contracts may be entered into at the time of closing for any new mortgages, in that the current mortgage company may offer the new homeowner upfront consideration in the form of a discount (e.g., on closing costs or interest rates) in return for the mortgage company having the right of first refusal in future refinancing. Of course, an opt-contract could be entered with respect to an existing mortgage, so long as upfront consideration is given to the consumer and the future right is given to the holder (e.g., broker). Here it could be said that the opt-contract is "added" to the mortgage, i.e., the subject matter of the future right is related to the existing mortgage.

An opt-contract may also be applied to consumer products, such as cellular telephones. For example, a cell phone user can be paid money up front on the premise that the cell phone user will contact the option listing broker (i.e., holder) when the cell phone user needs a new cell phone. If the holder is a cell phone service provider than the future right could be related to the cell phone user changing its service provider or its service plan. While the consumers entering into opt-contracts are described above as receiving an upfront monetary payment, other forms of consideration are possible, such as gift certificates, discounts, coupons, frequent flyer miles, cell phones or services, for example.

While the illustrative holder discussed above has been primarily a real estate or mortgage broker, the holder could be any type of broker. For example, employment agents (or recruiters) are brokers, as they bring together buyers and sellers of labor. In such a context if the holder is the recruiter, the consumer could be the employer, worker, or both. There are many examples of brokers that arrange for the procurement, sale and distribution of products, whether between manufactures or producers and wholesalers and/or retailers and/or typical consumers or users. Of course the insurance industry uses insurance brokers to sell insurance to individuals and business entities. In such a case the insurance broker could hold a future right to offer insurance to either. In other cases the holder could be a retailer, manufacturer, or wholesaler of products. For example, if the holder were a retailer that sells home appliances, but not televisions. The retailer could enter an opt-contract where the future right is related to the consumer's future decision to purchase a television. The right could give the retailer the first right in the future to sell that consumer a television. Of course, this type of opt-contract would also work if the retailer did typically sell televisions. Or a store could enter an opt contract wherein it has a right if the consumer changes brands or simply desires to purchase for any reason. Additionally, an individual salesperson could be the holder or an agent, with 1st right on making the sale of a product to the consumer.

Ship or transportation brokers keep informed of the movement of vessels, of cargo space available, and of shipping rates and sell this information to shippers and, potentially, to consumers of shipping services. Such brokers serve tramp carriers in the main, inasmuch as the larger shipping lines tend to have their own agents or brokers. Such brokers also serve as post agents, in which capacity they settle bills for stores and supplies, pay the wages of the crew, and negotiate insurance for the vessel and cargo. They may also arrange the sale of ships.

In organized markets, such as commodities and stock exchanges and bond markets, commission merchants and straight selling displace brokerage in large part, but between cities where there is not active exchange, brokers in grain and other commodities are active. As another example, particularly in the U.S., note brokers buy promissory notes and sell them to bank or other financial institutions. Traders in acceptances and foreign bills of exchange are known in the U.S. as acceptance dealers (i.e., brokers). Customs brokers, though, are not actually brokers in the traditional sense, but they do act as agents for importers in estimating duties and clearing goods—so as a service provider can be a holder of a future right. As another example, a pawn broker is a private money lender. In many instances, on-line service providers act as brokers of goods or services, e.g., products on eBay or Amazon, travel on Orbitz and so on. Additionally, travel agents in a traditional sense are brokers of vacation packages, accommodations, transportation and other services. Energy, telecom, internet service providers, cable companies are all providers that can serve as agents or holders or both.

In another embodiment, the invention may comprise a method of attracting or retaining one or more agency representatives to a particular business agency where those agency representatives may otherwise come and go, taking customers with them. Such a method may comprise the signing of potential customers of that particular business agency, so as to utilize that particular business agency if any particular need arises to do business with that particular business agency—regardless of whether or not the agency representatives remain with the business agency. The method may also include providing the potential future customers with an incentive such as a present consideration, wherein those potential future customers sign an opt-contract securing a future right related to entering a future relationship with that particular business agency. As with embodiments above, these opt-contracts can be recorded. Also, as an example, the business agency can be a real estate agency and the agency representative can be a real estate broker. In another embodiment, the agency may be a stock brokerage agency and the agency representative of the stock brokerage is a stock broker. In yet another embodiment, the agency may be an auto dealership and the representative could be a sales person or dealer spokesman.

In insurance related embodiments, the holder may be insurance agencies or companies obtaining a future right related to providing homeowner, title, malpractice, automotive, personal, health or business related insurance. In a mortgage or financing embodiment, the holder may be financing agencies could be lenders offering new mortgages, refinance opportunities, home equity loans or lines of credit or loan for investment property, timeshares or second homes.

In yet other embodiments, moving or relocation companies could be the holder of a future right to provide moving or relocation services. In yet other embodiments, auto companies or dealers could be holders of a future right related to the sale or lease of new or used vehicles. In yet other embodiments, auction houses or auctioneers could be the holder of a future right related to providing auction services. In yet other embodiments, dealers of coins, automobiles, wine, art, jewelry or other collectibles could holder a future right related to selling such goods.

In yet other embodiment, a travel, cruise, airline or vacation agencies or outlets could hold future rights to provide their services. In construction suppliers of building materials could hold a future right related to providing such materials to construction companies. Similarly, auto part suppliers could hold future rights related to providing auto parts to mechanics and garages.

In yet another embodiment, a casket or headstone company could hold a future a future right related to providing such products to undertakers or funeral homes. In other embodiments, an agency could hold a future right related to providing tickets to sport, theater, concert or other entertainment events. With respect to the Internet, a provider may hold a future right related to providing or offering for sale domain names.

In another embodiment, a credit card company could hold a future right related to providing or offering credit cards or accomplishing balance transfers. In yet another embodiment, a provider could hold a future right to performing fund raising on behalf of, for example, non-profits organizations.

As described with respect to FIG. 2A-FIG. 2E in any of the above embodiments an opt-contract agent may serve to obtain the holder right on behalf of the provider/holder. For example, an insurance agent can act to obtain a future right on behalf of an insurance company. A mortgage broker can act to obtain a future right for the lender. A travel agents can serve to obtain a future right on behalf of an airline, cruise line, hotel chain, etc. But the agent need not have a common business area with the ultimate holder of the future right. For example, a bank or credit card company could offer a future right on behalf of a travel company, insurance company, auto company, or lender. In such a case, the credit card holder could, for example, receive a $100 credit toward its credit card balance or, for example, a check for $100 instantly negotiable in exchange for giving a future right for a lender to compete for the holder's next mortgage, product or service. Similarly, a utility company could serve as an agent for obtaining a future right for a credit card company to compete for the consumers future credit card business. The present invention, therefore, could take any number of embodiments.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As used herein, the terms "includes" and "including" mean without limitation. It is intended by the following claims to claim any and all modifications and variations that fall within the true scope of the inventive concepts.

What is claimed is:

1. A method of obtaining a future right, said method comprising the steps of:
   A. identifying a consumer and a holder,
   B. generating an opt-contract establishing an upfront consideration to the consumer and coincidentally establishing a future right option in the holder, wherein the future right is a right to offer or to provide to the consumer a defined set of goods or services in response to a trigger event;
   C. in response to the trigger event, said holder having an option to offer or provide the set of goods or services related to consumer controlled property;
   wherein at least a portion of one or more of the above steps is carried out by a computer.

2. The method of claim 1, further comprising, prior to step C, monitoring for an occurrence of the trigger event.

3. The method of claim 1, further comprising the step of:
   D. recording said option contract.

4. The method of claim 1, further comprising, establishing an agent between the holder and the consumer.

5. The method of claim 1, wherein:
   the upfront consideration comprises a loan to the consumer, and the opt contract requires, in response to the trigger event and the holder opting to provide the sets of goods and services to the consumer, at least a portion of the loan will be forgiven.

6. The method of claim 5 wherein the goods or services comprise goods or services related to the transfer of real estate.

7. The method of claim 5 wherein the goods or services comprise goods or services related to the transfer of tangible property.

8. The method of claim 5 wherein the goods or services comprise goods or services related to the transfer of intangible property.

9. The method of claim 5 wherein the goods or services comprise goods or services related to a mortgage.

10. The method of claim 1, wherein the opt contract requires, in response to the trigger event and the holder being prevented from offering or providing the goods or services by the behavior of the consumer, that the consumer must return at least a portion of the value of the upfront consideration to the holder.

11. The method of claim 10 wherein the goods or services comprise goods or services related to the transfer of real estate.

12. The method of claim 10 wherein the goods or services comprise goods or services related to the transfer of tangible property.

13. The method of claim 10 wherein the goods or services comprise goods or services related to the transfer of intangible property.

14. The method of claim 10 wherein the goods or services comprise goods or services related to a mortgage.

15. The method of claim 1, wherein the trigger event is an event initiated by an action of the consumer.

16. The method of claim 15 wherein the goods or services comprise goods or services related to the transfer of real estate.

17. The method of claim 15 wherein the goods or services comprise goods or services related to the transfer of tangible property.

18. The method of claim 15 wherein the goods or services comprise goods or services related to the transfer of intangible property.

19. The method of claim 15 wherein the goods or services comprise goods or services related to a mortgage.

20. The method of claim 1 wherein the goods or services comprise goods or services related to the transfer of real estate.

21. The method of claim 1 wherein the goods or services comprise goods or services related to the transfer of tangible property.

22. The method of claim 1 wherein the goods or services comprise goods or services related to the transfer of intangible property.

23. The method of claim 1 wherein the goods or services comprise goods or services related to a mortgage.

24. The method of claim 1 wherein the future right to offer or provide a defined set of good or services is a future right to offer a defined set of goods and services.

25. The method of claim 1, wherein said trigger event is outside the control of the holder.

26. A method attracting and retaining agency representatives for an agency provider, said method comprising the steps of:
  A. defining a set of consumers having a relationship to an agency representative;
  B. providing a present consideration to the set of consumers and coincidentally establishing a future right for the agency provider to offer or provide, at the agency provider's option, a defined set of goods or services in response to a trigger event, said defined set of goods and services being related to consumer controlled property;
  C. in response to the trigger event, said provider providing, offering to provide or opting not to provide or not to offer to provide the set of goods or services;
    wherein at least a portion of one or more of the above steps is carried out by a computer.

27. The method of claim 26, further comprising, prior to step C, monitoring for an occurrence of the trigger event.

28. The method of claim 26 wherein the present consideration comprises a loan to at least one of the set of consumers, and further comprising:
  requiring, in response to the trigger event and the provider providing the set of goods and services to the at least one of the set of consumers, at least a portion of the loan will be forgiven.

29. The method of claim 26, further comprising requiring, in response to the trigger event and the holder being prevented from offering or providing the goods or services to at least one of the set of consumers by the behavior of said at least one of the set of consumers, that said at least one of the set of consumers must return at least a portion of the value of the consideration to the holder.

30. The method of claim 26, wherein the trigger event is an event initiated by an action of at least one of the set of consumers.

31. The method of claim 26 wherein the goods or services comprise goods or services related to the transfer of real estate.

32. The method of claim 26 wherein the goods or services comprise goods or services related to the transfer of tangible property.

33. The method of claim 26 wherein the goods or services comprise goods or services related to the transfer of intangible property.

34. The method of claim 26 wherein the goods or services comprise goods or services related to a mortgage.

35. An opt-contract system comprising a computer program code executable by at least one processor, the computer program code including logic comprising the steps of:
  A. identifying a consumer and a holder;
  B. generating an opt-contract establishing an upfront consideration to the consumer and coincidentally establishing a future right option in the holder, wherein the future right is a right to offer or provide to the consumer a defined set of goods or services in response to a trigger event;
  C. in response to the trigger event, said holder, at its option, offering or providing said holder having an option to offer or provide the set of goods or services related to consumer controlled property.

36. The method of claim 35, wherein:
  the upfront consideration comprises a loan to the consumer, and
  the opt contract requires, in response to the trigger event and the holder opting to provide the sets of goods and services to the consumer, at least a portion of the loan will be forgiven.

37. The method of claim 35, wherein the opt contract requires, in response to the trigger event and the holder being prevented from offering or providing the goods or services by the behavior of the consumer, that the consumer must return at least a portion of the value of the upfront consideration to the holder.

38. The method of claim 35, wherein the trigger event is an event initiated by an action of at least one of the set of consumers.

39. The method of claim 35 wherein the goods or services comprise goods or services related to the transfer of real estate.

40. The method of claim 35 wherein the goods or services comprise goods or services related to the transfer of tangible property.

41. The method of claim 35 wherein the goods or services comprise goods or services related to the transfer of intangible property.

42. The method of claim 35 wherein the goods or services comprise goods or services related to a mortgage.

43. The method of claim 35 wherein the future right to offer or provide a defined set of good or services is a future right to offer a defined set of goods and services.

44. An opt-contract system comprising:
  A. a database resident on a computer system comprising data identifying a consumer and a holder;
  B. an opt-contract module configured for generating an opt-contract establishing an upfront consideration to the consumer and coincidentally establishing a future right option in the holder, wherein the future right is a right to offer or provide to the consumer a defined set of goods or services related to consumer controlled property in response to a trigger event;
  C. a trigger module configured for prompting the holder, at its having an option and in response to the trigger event, to offer or provide offering or providing the set of goods or services.

45. An opt-contract registry system comprising:
  A. at least one registry computer system comprising an interface for facilitating communication with one or more external computer systems via a network;
  B. at least one database coupled to the registry computer system and comprising a set of opt-contract data identifying, for each of a plurality of opt-contracts, at least one consumer, at least one upfront consideration to the at least one consumer, at least one holder, and a set of future right options for the at least one holder related to the at least one consumer, wherein each future right is a right for the at least one holder to offer or to provide to the at least one consumer, at the at least one holder's option, a defined set of goods or services related to consumer controlled property in response to at least one trigger event; and
  C. a trigger module configured for monitoring a set of external systems and generating a future right prompt in response to detection of the at least one trigger event.

46. The method of claim 45, wherein:
  the at least one upfront consideration to the at least one consumer comprises a loan to the at least one consumer, and
  at least one of the plurality of opt contracts corresponds to the at least one consumer receiving the loan and requires, in response to the trigger event and the holder opting to provide the sets of goods and services to the at least one consumer, at least a portion of the loan will be forgiven.

47. The method of claim 45, wherein at least one of the plurality of opt contract requires, in response to the trigger event and the holder being prevented from offering or providing the goods or services by the behavior of the at least one consumer, that said at least one consumer must return at least a portion of the value of the at least one upfront consideration to the holder.

48. The method of claim 45, wherein the at least one trigger event is an event initiated by an action of the at least one of the set of consumers.

49. The method of claim 45 wherein the goods or services comprise goods or services related to the transfer of real estate.

50. The method of claim 45 wherein the goods or services comprise goods or services related to the transfer of tangible property.

51. The method of claim 45 wherein the goods or services comprise goods or services related to the transfer of intangible property.

52. The method of claim 45 wherein the goods or services comprise goods or services related to a mortgage.

53. The method of claim 45 wherein the future right to offer or provide a defined set of good or services is a future right to offer a defined set of goods and services.

54. A method of obtaining a future right, said method comprising the steps of:
   A. identifying a consumer and a holder,
   B. generating an opt-contract establishing an upfront consideration to the consumer and coincidentally establishing a future right option in the holder, wherein the future right is a right to offer or to provide to the consumer a defined set of goods or services in response to a trigger event;
   C. in response to the trigger event, said holder having an option to offer or provide the set of goods or services related to real property;
      wherein at least a portion of one or more above steps is carried out by a computer.

55. The method of claim 54, further comprising, prior to step C, monitoring for an occurrence of the trigger event.

56. The method of claim 54, further comprising the step of:
   D. recording said option contract.

57. The method of claim 54, further comprising, establishing an agent between the holder and the consumer.

58. The method of claim 54, wherein:
   the upfront consideration comprises a loan to the consumer, and the opt contract requires, in response to the trigger event and the holder opting to provide the sets of goods and services to the consumer, at least a portion of the loan will be forgiven.

59. The method of claim 54, wherein the opt contract requires, in response to the trigger event and the holder being prevented from offering or providing the goods or services by the behavior of the consumer, that the consumer must return at least a portion of the value of the upfront consideration to the holder.

60. The method of claim 54, wherein the trigger event is an event initiated by an action of the consumer.

61. The method of claim 54 wherein the goods or services comprise goods or services related to a mortgage.

62. A method affiancing and retaining agency representatives for an agency provider, said method comprising the steps of:
   A. defining a set of consumers having a relationship to an agency representative;
   B. providing a present consideration to the set of consumers and coincidentally establishing a future right for the agency provider to offer or provide, at the agency provider's option, a defined set of goods or services in response to a trigger event, said defined set of goods and services being related to real property;
   C. in response to the trigger event, said provider providing, offering to provide or opting not to provide or not to offer to provide the set of goods or services;
      wherein at least a portion of one or more above steps is carried out by a computer.

63. The method of claim 62, further comprising, prior to step C, monitoring for an occurrence of the trigger event.

64. An opt-contract system comprising a computer program code executable by at least one processor, the computer program code including logic comprising the steps of:
   A. identifying a consumer and a holder;
   B. generating an opt-contract establishing an upfront consideration to the consumer and coincidentally establishing a future right option in the holder, wherein the future right is a right to offer or provide to the consumer a defined set of goods or services in response to a trigger event;
   C. in response to the trigger event, said holder, at its option, offering or providing said holder having an option to offer or provide the set of goods or services related to real property.

65. An opt-contract system comprising:
   A. a database comprising data identifying a consumer and a holder;
   B. an opt-contract module configured for generating an opt-contract establishing an upfront consideration to the consumer and coincidentally establishing a future right option in the holder, wherein the future right is a right to offer or provide to the consumer a defined set of goods or services related to real property in response to a trigger event;
   C. a trigger module configured for prompting the holder, at its having an option and in response to the trigger event, to offer or provide offering or providing the set of goods or services.

66. An opt-contract registry system comprising:
   A. at least one registry computer system comprising an interface for facilitating communication with one or more external computer systems via a network;
   B. at least one database coupled to the registry computer system and comprising a set of opt-contract data identifying, for each of a plurality of opt-contracts, at least one consumer, at least one upfront consideration to the at least one consumer, at least one holder, and a set of future right options for the at least one holder related to the at least one consumer, wherein each future right is a right for the at least one holder to offer or to provide to the at least one consumer, at the at least one holder's option, a defined set of goods or services related to real property in response to at least one trigger event; and
   C. a trigger module configured for monitoring a set of external systems and generating a future right prompt in response to detection of the at least one trigger event.

* * * * *